(12) United States Patent
Righini et al.

(10) Patent No.: US 11,859,735 B2
(45) Date of Patent: Jan. 2, 2024

(54) CLAMPING DEVICE

(71) Applicant: F.lli Righini S. R. L., Ravenna (IT)

(72) Inventors: Renzo Righini, Ravenna (IT); Franco Argelli, Ravenna (IT)

(73) Assignee: F.LLI RIGHINI S. R. L., Ravenna (IT)

( * ) Notice: Subject to any disclaimer, the term of this patent is extended or adjusted under 35 U.S.C. 154(b) by 1162 days.

(21) Appl. No.: 16/332,050

(22) PCT Filed: Mar. 13, 2018

(86) PCT No.: PCT/IB2018/051655
§ 371 (c)(1),
(2) Date: Mar. 11, 2019

(87) PCT Pub. No.: WO2018/167660
PCT Pub. Date: Sep. 20, 2018

(65) Prior Publication Data
US 2019/0226604 A1    Jul. 25, 2019

(30) Foreign Application Priority Data

Mar. 13, 2017  (IT) ......................... 102017000027125

(51) Int. Cl.
| | | |
|---|---|---|
| *F16L 1/23* | (2006.01) | |
| *E21B 19/07* | (2006.01) | |
| *F16L 1/20* | (2006.01) | |
| *F16L 3/10* | (2006.01) | |

(52) U.S. Cl.
CPC ................ *F16L 1/23* (2013.01); *E21B 19/07* (2013.01); *F16L 1/207* (2013.01); *F16L 3/1066* (2013.01)

(58) Field of Classification Search
CPC ..................................................... F16L 3/1066
USPC ............................................................ 269/86
See application file for complete search history.

(56) References Cited

U.S. PATENT DOCUMENTS

| | | | | |
|---|---|---|---|---|
| 3,538,561 | A * | 11/1970 | Traian .................... | E21B 19/10 175/423 |
| 5,335,756 | A * | 8/1994 | Penisson ................. | E21B 19/10 188/67 |
| 5,848,647 | A * | 12/1998 | Webre ..................... | E21B 19/07 188/67 |
| 6,264,395 | B1 * | 7/2001 | Allamon ................. | E21B 19/10 285/123.5 |
| 6,729,803 | B1 * | 5/2004 | Baylot ..................... | F16L 1/23 405/168.4 |
| 7,686,088 | B2 * | 3/2010 | Shahin .................... | E21B 19/07 166/382 |

(Continued)

*Primary Examiner* — Matthew Troutman
*Assistant Examiner* — Douglas S Wood
(74) *Attorney, Agent, or Firm* — Leason Ellis LLP

(57) ABSTRACT

Clamping device (1) for axially blocking an axial-symmetrical body (CA); the clamping device (1) comprising at least a support (10) of given angular extension, provided with a plurality of laminar bodies (20) extending longitudinally in a given direction (D), each of which being incorporated in a substantially cylindrical interface (22) (23) made of deformable material so as to copy the outer shape of the axial-symmetrical body (CA) and to generate the tangential force in radial manner; each laminar body (20) having a toothed transverse face (24) to interact superficially with the axial-symmetrical body (CA); the laminar bodies (20) being carried by the support (10) through elongated members (30)(30').

17 Claims, 5 Drawing Sheets

(56) References Cited

U.S. PATENT DOCUMENTS

| | | | |
|---|---|---|---|
| 8,641,325 B2* | 2/2014 | Baylot | F16L 1/207 |
| | | | 405/168.4 |
| 10,612,693 B2* | 4/2020 | Vehmeijer | F16L 1/23 |
| 2006/0113074 A1* | 6/2006 | Baird | E21B 19/10 |
| | | | 294/82.16 |
| 2018/0128061 A1 | 5/2018 | Van Duivendijk | |

* cited by examiner

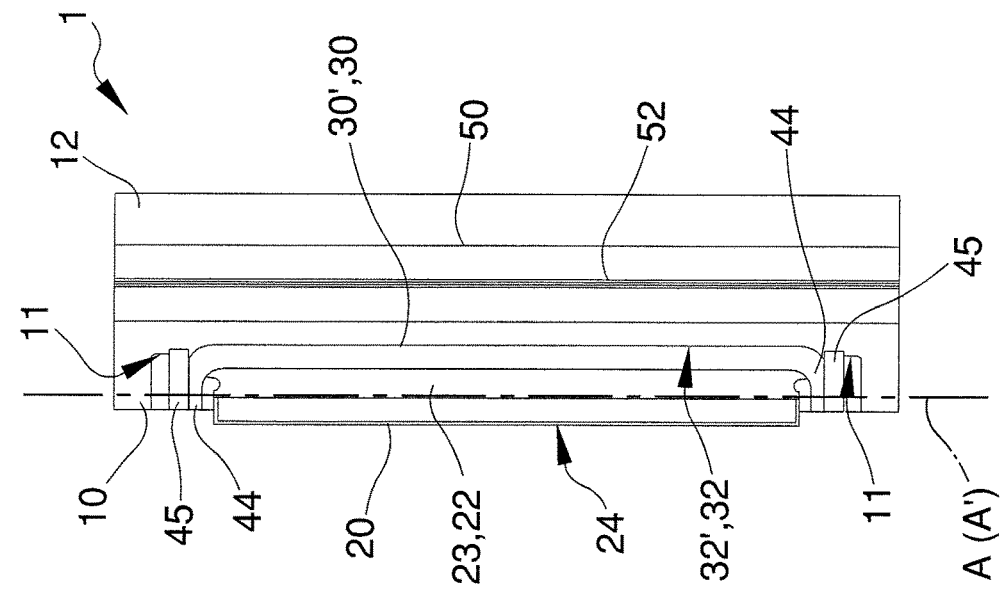
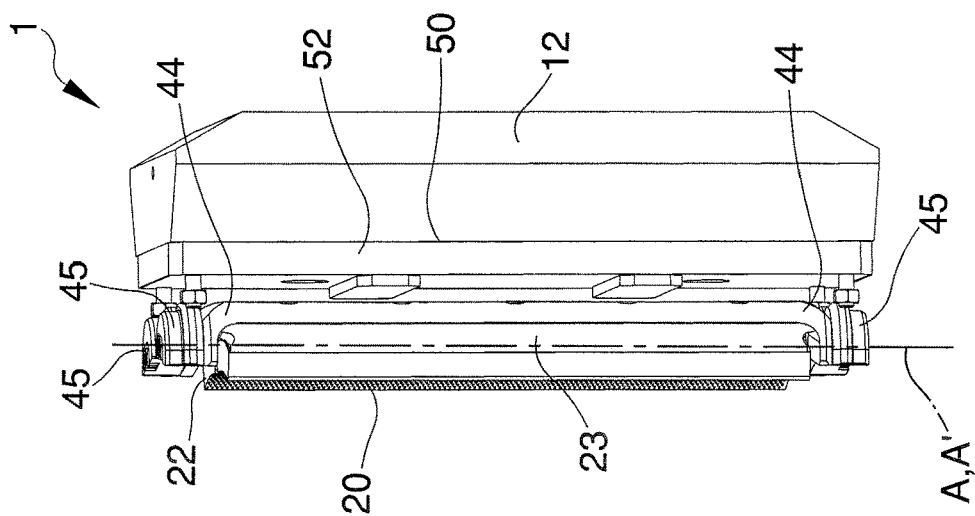
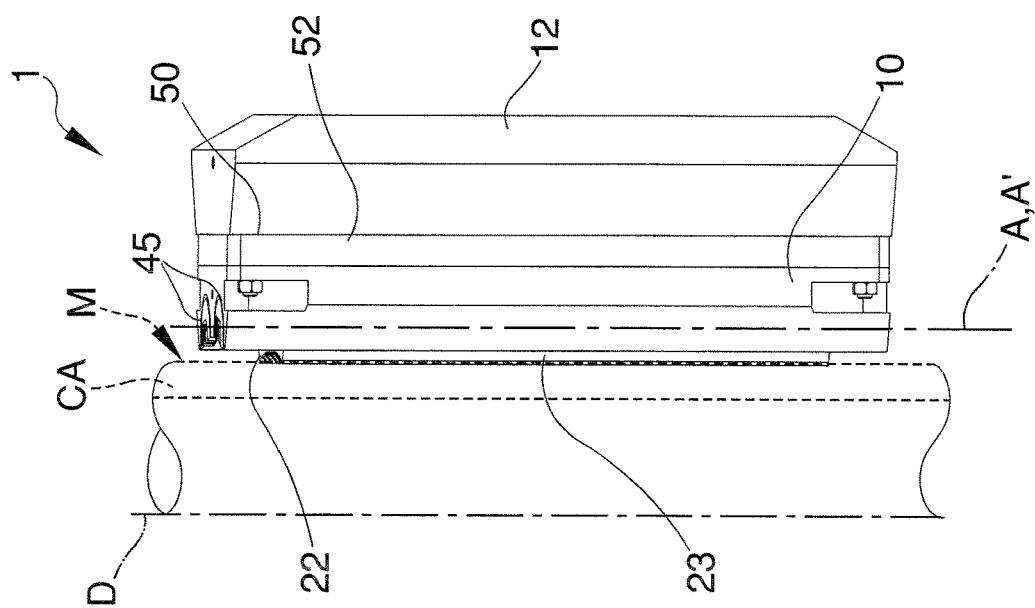

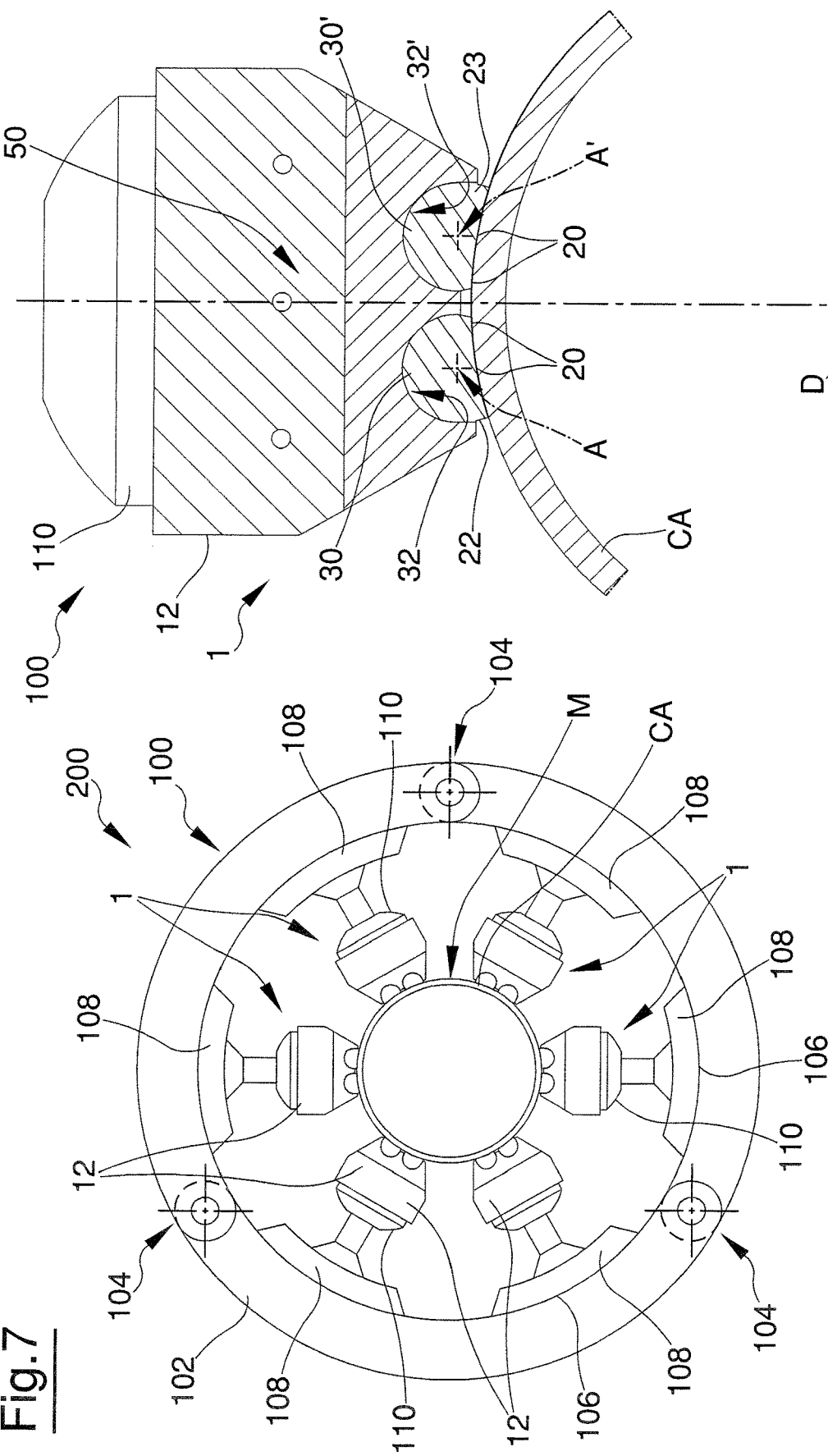

CLAMPING DEVICE

RELATED APPLICATIONS

The present application is a National Phase application of International application PCT/IB2018/051655 filed Mar. 13, 2018 and claiming priority of Italian application 10 2017 0000 27125 filed Mar. 13, 2017, both applications are incorporated herein by reference thereto.

The present invention relates to a clamping device. In particular, the present invention refers to a clamping device suitable for axially blocking axial-symmetrical bodies subjected to axial stresses. More in detail, the present invention relates to a clamping device suitable for axially blocking axial-symmetrical bodies subjected to axial forces by applying a radial force produced by a plurality of clamping members to hold each axial-symmetrical body through friction.

BACKGROUND TO THE INVENTION

In the field of the constructions requiring the installation of elongated members, including metal pipes and umbilicals (coated with plastic) to construct pipelines for above- and under-ground or undersea transportation of fluids, electricity or data, there is often the need to suspend the installation and, therefore, to keep these elongated members by holding them at the ends thereof or at intermediate sections; this allows to perform pre-laying operations or maintenance of the machines or, simply, to join the ends of the elongated members in a rigid and fluid-tight manner. When the axial forces acting on the elongated members are particularly significant (as when the end of the last pipe laid to construct an undersea pipeline shall be held), the loads may be of about 2000 tons (Mg). In this case, the elongated members are held by applying radial loads thereto by means of machines (or "clamps") comprising a plurality of clamping devices, which are arranged in parallel and each of which shall bear a portion of the load acting on the elongated members. Each clamp is provided with a plurality of uniformly distributed clamping devices that, fluid-dynamically or mechanically actuated, produce radial loads that can be transformed into axial loads whose magnitude is as greater as higher the relative friction coefficient between the surface of the clamping saddle/shoe and the outer sheath of the elongated member to be held.

The Applicant has already dealt with this subject in the patent document IT1405435, whose teachings are incorporated in the present description for the sake of text economy, as well as the teachings of other relevant prior art patents.

In that case, each clamping device comprises two shoes carried side by side by a saddle, which is in turn carried in a hinge-like way around a longitudinal axis parallel to that of the clamped elongated member. This solution, the application of which is giving excellent results to the applicant, has the drawback of the difficulty in uniformly distributing the loads, axially acting on the elongated member, among the individual clamping devices when these devices are arranged on several layers along the axial direction for the elongated member CA. In fact, it is difficult to balance and distribute the axially acting load among the clamping devices arranged on several layers, and therefore the clamping devices support a decreasing load starting from the first device, interfacing with the sheath of the elongated member to be clamped (i.e. the load device arranged at the side of the already laid elongated member, therefore directly facing the load and subjected to the maximum load value) up to the last clamping device, holding the elongated member at the side of the corresponding free end, therefore subjected to a negligible load.

The different distribution of the loads acting on the various segments of the elongated members results in different operating conditions for the clamping devices arranged in different positions on the clamp that not only require the application of different tangential loads on the sheath of the clamped elongated member, but also cause a non-uniform deformation thereof and stress the clamping members in a non-uniform manner, causing different levels of wears and therefore requiring to perform maintenance at different times and often only on some clamping devices at a time.

It is easy to understand that this situation represents a problem that the applicant wants to remedy. In view of the situation described above, it would be desirable to have available a clamp that is provided with a clamping device or a plurality of clamping devices arranged longitudinally in series, each of which comprising shoes/saddles, and that, in addition to limiting and possibly overcoming the drawbacks of the prior art described above, defines a new standard for this type of clamps.

SUMMARY OF THE PRESENT INVENTION

The present invention relates to a clamping device. In particular, the present invention refers to a clamping device suitable for axially blocking axial-symmetrical bodies subjected to axial stresses. More in detail, the present invention relates to a clamping device suitable for axially blocking axial-symmetrical bodies subjected to axial forces by applying a radial force produced by a plurality of clamping devices to hold each axial-symmetrical body through friction.

In particular, an object of the present invention is to provide a clamping device usable to hold elongated members subjected to particularly high axial traction forces that overcomes the drawbacks of the prior art described above in a simple and economical manner.

According to the present invention a clamping device is provided, which can be used to hold elongated members subjected to particularly high axial traction forces, whose main features will be described in at least one of the following claims.

A further object of the present invention is to provide a clamp provided with a plurality of clamping devices angularly distributed in a given manner to exert a radial force sufficient to hold axially by friction elongated members subjected to particularly high axial traction forces, overcoming the drawbacks of the prior art described above in a simple and economical manner.

According to the present invention, a clamp is also provided comprising a plurality of clamping devices provided with a plurality of clamping devices, the main features of the clamp being described in at least one of the following claims.

BRIEF DESCRIPTION OF DRAWINGS

Further characteristics and advantages of the clamping device and the clamp comprising a plurality of clamping device according to the invention will be more apparent from the description below, set forth with reference to the attached drawings, that illustrate some examples of embodiment, where identical or corresponding parts of the group are identified by the same reference numbers. In particular:

FIG. 1 is a side elevation schematic view of a first preferred embodiment of a clamping device according to the present invention in an operating step;

FIG. 2 is a schematic perspective view of FIG. 1, with some parts removed for the sake of clarity;

FIG. 3 is a longitudinal cross-section of FIG. 1, in enlarged scale and with some parts removed for the sake of clarity;

FIG. 7 is a plan schematic view of a clamp comprising a plurality of clamping devices arranged in circumference;

FIG. 8 shows a detail of FIG. 7 in enlarged scale and with some parts removed for the sake of clarity;

DETAILED DESCRIPTION OF THE PRESENT INVENTION

Figure 6:
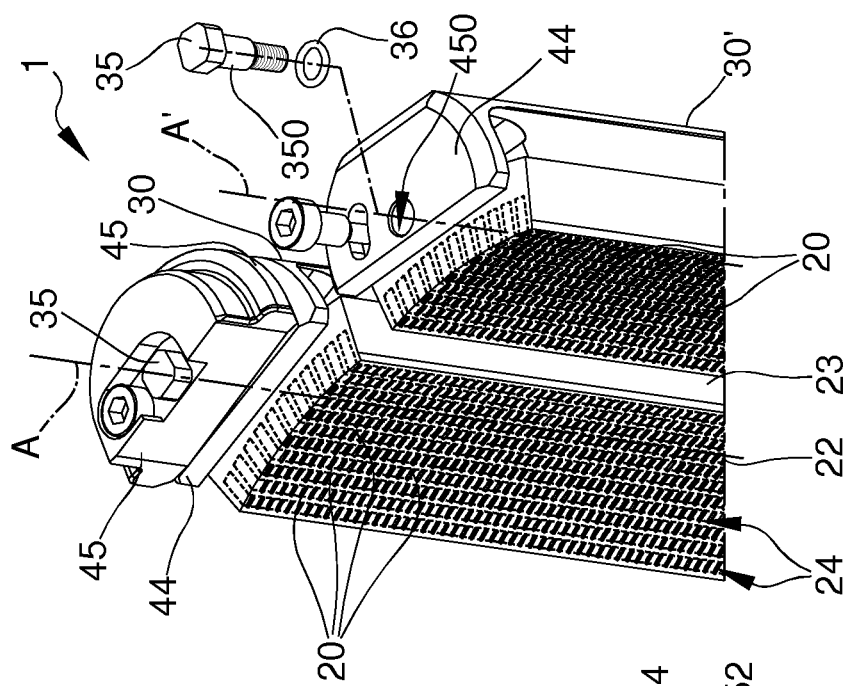
FIG. 6 shows FIG. 5 in enlarged scale and with some parts removed for the sake of clarity.

In FIG. 1, number 1 indicates, as a whole, a clamping device 1, designed to perform the laying operations of umbilicals, elongated bodies CA of substantially axial-symmetrical shape (wherein in FIG. 1 only a portion of a longitudinal cross-section of an exemplar is illustrated with broken lines for drawing economy) or tubes in general. In particular, these devices shall be distributed at constant angular pitch transversally to a given direction D which, in use, is substantially coaxial with the central axis of the portion of the CA body to be clamped. Therefore, the clamping devices 1 are arranged so as to apply, in use, a plurality of axial forces to a body CA that are proportional to the sum of the radial loads modulated with the friction coefficient between the clamping device and the elongated body. This axial force is the resultant of the frictional forces generated between the sheath M, delimiting the body CA externally, and the set of saddles 1. With reference to FIG. 7 again, the clamping devices 1 are coupled together through a frame 102 which can be modular and therefore provided with at least a portion 104 which can be opened to allow transversal coupling with a body CA. With reference to FIG. 7 again, it is noticeable that the clamping devices 1 are connected to the frame 102 through the interposition of linear actuators 106, which are arranged between reinforced portions 108 of the frame 102 and a spherical articulation 110 which is arranged at the back of each individual clamping device 1.

With reference to FIG. 1, the clamping device 1 extends along the given direction D and comprises a support 10 of given angular extension, shaped to copy the outer shape of the body CA (as better described below). The support 10 embodies at least one interface 22/23 provided, at the front thereof, with a plurality of laminar bodies 20. The function of these bodies, made of metal, is radially to interact with the sheath M of the body CA through a notched outer face 24, better shown in FIGS. 5 and 6. Each interface 22 and 23 is made of plastic, which can be temporarily deformed and, in the case of bodies CA of particularly large diameter, the support 10 must have adequate dimensions and, if useful, it may also have more than two interfaces 22/23. Moreover, each of the laminar bodies 20 is at least partially included (embedded) in the plastic of the same interfaces 22, 23.

Figure 5:
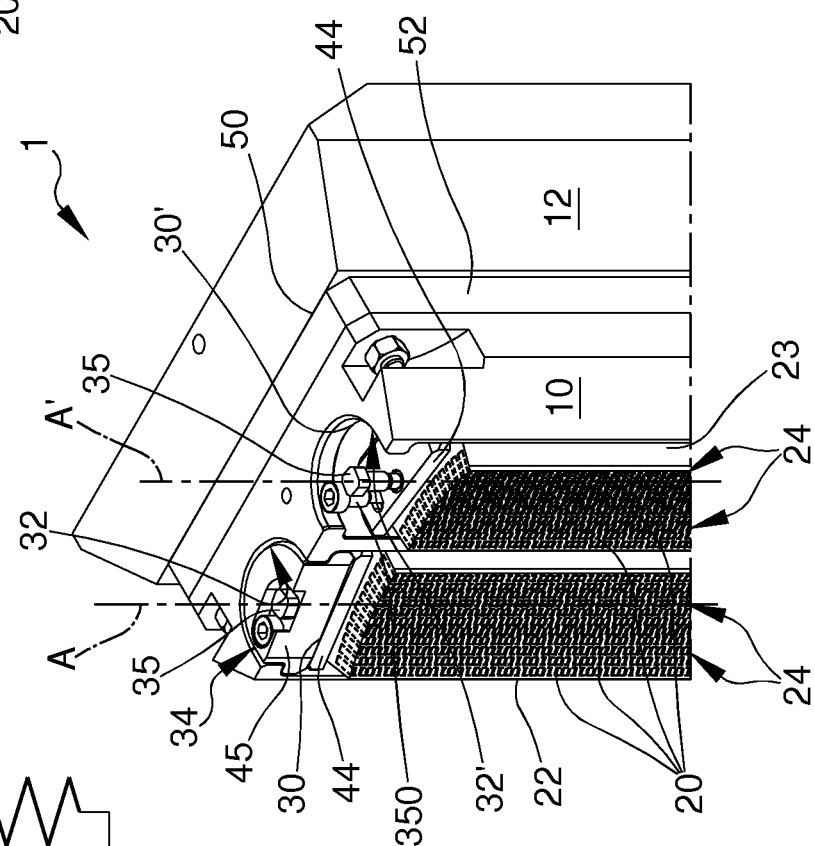
FIG. 5 is a schematic perspective view from the top of a detail of FIG. 1 in enlarged scale.

With reference to FIG. 5, the support 10 includes a pair of these interfaces 22 and 23 to maximize the ability to copy the outer surface of the axial-symmetrical body CA with the laminar bodies 20, in a wide range of radial dimensions. In view of what described above it is easily understood that the choice of representing, in the attached figures, the support 10 with only two interfaces 22 and 23 is exclusively due to economy of drawing.

In view of the above description, the laminar bodies 20 are suitable to perform a tangential action on the body CA to generate an axial force for balancing the axial load applied on the body CA and, as they are incorporated in the interface 22/23, they are longitudinally and radially movable to the extent it is allowed by the stiffness of the plastic of which the same interface 22/23 is made. The intensity of this action is proportional to the tangential load applied by the body CA in axial direction to the laminar bodies 20 and to the contact area between the external faces 24 of the laminar bodies 20 and the sheath M.

With reference to FIGS. 1, 2, 3 and 5, the clamping device 1 has a base 12 at the back, which is suitable to absorb the force associated with the radial and tangential forces acting, in use, on the clamping device 1 once it has been connected to a fixed structure.

Each laminar body 20 extends longitudinally (in direction D) and is integrated into, and is backside delimited by, a respective elongate member 30 and 30', one of which is visible in FIG. 3. Each elongated member 30/30' is made of metal, without however limiting the scope of the present invention, and is coupled to the support 10 in a tilting manner around a respective longitudinal axis A/A' parallel to the direction D.

In particular, the support 10 has, for each elongated member 30/30', a respective cylindrical seat 32/32', open at the front and better visible in FIG. 5 and in FIG. 8. Each elongated member 30/30' is delimited at the back by a respective cylindrical face facing the respective seat 32/32', whose radius is slightly greater than a radius of the respective elongated member 30/30'. With reference to FIG. 3 and to FIG. 6, each elongated member 30/30' is shaped similarly to a cradle longitudinally delimited by two respective end portions 44, each of which is substantially L-shaped, even if this feature does not limit the protective scope of the invention. It is noticeable that each elongated member 30/30' is rotoidally coupled to the support 10 through a respective head 45 (FIGS. 2, 3, 5, 6, 9, 10). Each head 45 is shaped like a longitudinal closing member of the seat 32/32' and is therefore provided with a toroidal projection 45', whose function is to allow the same head 45 to resist against the axial forces acting on the respective elongated member 30/30'. The head 45 is housed, in a conjugated way, in a transversal seat 11 of the support 10, and this seat 11 is therefore partially toroidal as well as coaxial with the respective axis A/A'. Each end portion 44 is coupled to the respective head 45 through a pin 35; each pin 35 is coaxial with the respective axis A/A' and is provided with a shank 350, which engages, with radial clearance, a central hole 450 (FIG. 6) of the same head 45, and that is therefore connected to the support 10. Therefore, the coupling between each elongated member 30/30' and the support 10 through the respective seat 32/32' is with radial clearance; therefore, as it will be better explained below, in use each elongated member 30/30' is free to rotate around the respective axis A/A' when no external load is applied. Obviously, the sizing of each end portion 44 and the distance from the heads of the laminar bodies 20 allow to define the maximum longitudinal displacement elastically allowed for each interface 22/23.

With reference to FIGS. 5 and 6, the clamping device 1 comprises a centring unit 34 for each elongated member 30/30' to maintain the respective elongated member 30/30' aligned with the direction D and centred with respect to the seat 32/32'. This centring unit 34 comprises the pair of pins 35 (one for each end portion 44) of each elongated member 30/30' and a toroidal interface 36 (shown only in FIG. 6) constituted by an elastic member, for example a gasket made of rubber, of the type usually called "O-ring", which engages the hole 450 and is therefore carried by each pin 35 in a substantially coaxial way. The choice of this type of interface allows the elongated members 30/30' to adhere cylindrically, and therefore in a form-fitting manner, to the respective seats 32/32' under the thrust of a force transversal to the given direction D which is slightly greater than a minimum threshold value based on the mechanical characteristics of the toroidal interface 36, and therefore once the elongated members 30/30' have been rotated relative to their axis A/A° axis up to an angular position defined by the outer conformation of the sheath M of the body CA. It is easily understood that this angular position balances the transversal thrusts on the portions of longitudinal edge of each elongated member 30/30'. This feature allows the clamping device 1 to be adapted to the conformation of the sheath of substantially cylindrical elongated bodies CA in a wide dimensional range while the clamping ability of the clamping device 1 remains unchanged.

Therefore, this ability allows each elongated member 30/30', in use, to couple in a form-fitting manner to the corresponding seat 32/32', and therefore to adhere thereto in an angularly fixed manner by friction.

It is useful to specify that the toroidal projection 45' of each head 45 is rigidly connected to the respective seat 11 so that the support 10 incorporates it so as to be equivalent to a single body. The connection may be done, for instance but without limitation, through welding. Therefore, each elongated member 30/30' is carried by the support 10 through two respective end portions 44, each of which is rotoidally coupled to a head 45 through a centring unit 34.

With reference to FIGS. 1, 2 and 3 again, and with particular reference to FIG. 5, the coupling between the support 10 and the base 12 is mediated by a damping unit 50 comprising a sandwich-shaped body 52 made of elastic material, for example, but with no limitation, by coupling rubber sheets and plates made of metal, usually of steel. In view of the above description, the dampening unit 50 is of the tangential type.

Figure 12:
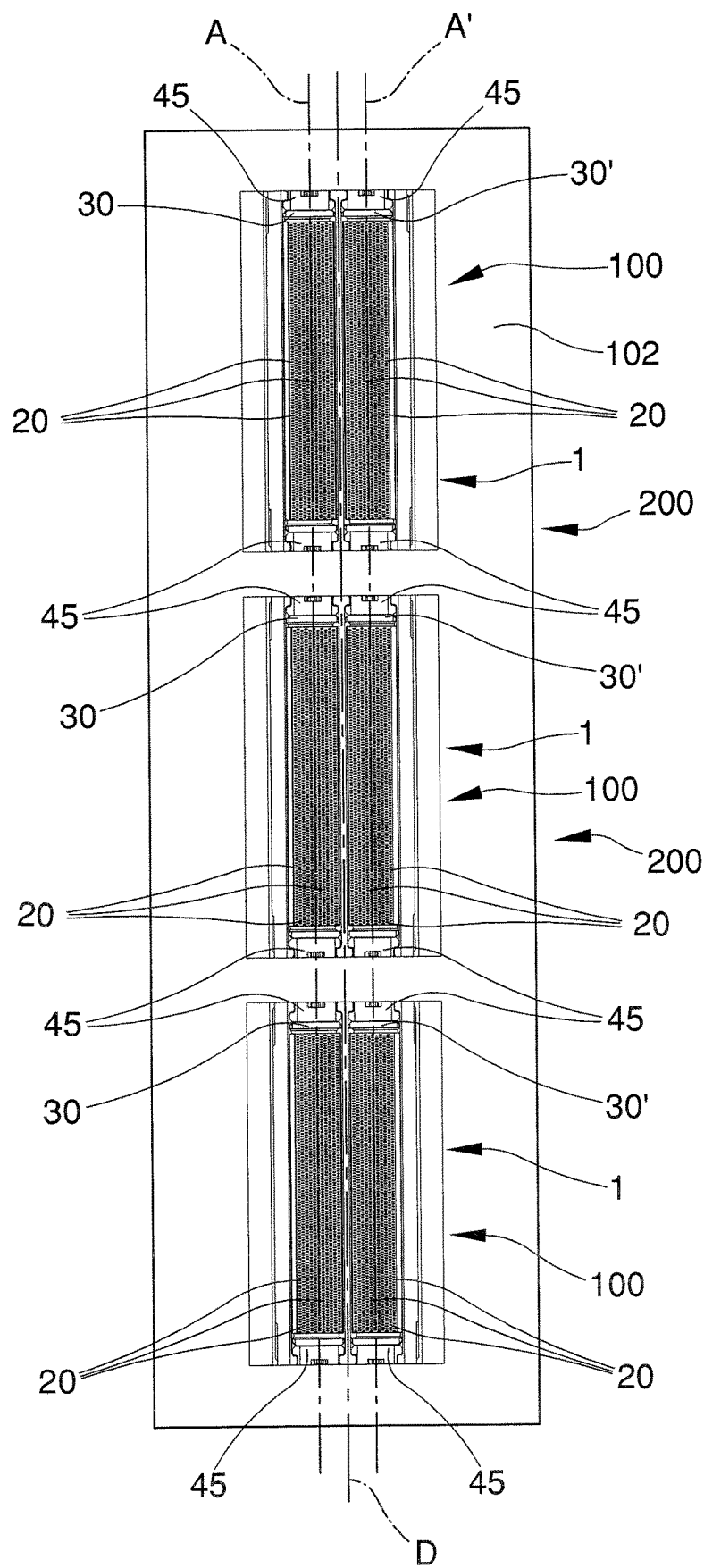
FIG. 12 is a side elevation view of a longitudinal portion of FIG. 7, in enlarged scale and with some parts removed for the sake of clarity.

Moreover, in view of the above description, in order to stop the body CA in a stable position it could be necessary to construct a clamp 200 provided with a plurality of clamping devices 1 distributed both radially (as in FIG. 7) in a single-layer clamp 100, and axially at regular pitch (hereinafter "layered" or similar), so as to have a multilayer clamp 200, shown in FIG. 12, where only a longitudinal portion thereof is shown for the sake of drawing economy.

Figure 4:
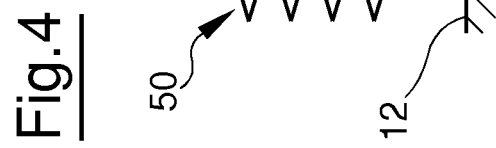
FIG. 4 is a mechanical diagram of FIG. 1.

In view of the description above, each clamping device 1 allows an axial displacement of the respective laminar bodies 20 given by the combination of the displacement of the same interfaces 22/23 with respect to the respective end portions 44 and the sandwich-shaped body 52 of the dampening unit 50. Moreover, both the elongated members 30/30' and the dampening unit 50 react to the load in a yielding manner and are mechanically arranged in series with respect to the body CA, as schematically shown in FIG. 4. Therefore, the elongated members 30/30' and the dampening unit 50 can be considered two shock-absorbing stages arranged mechanically in series, which are indicated by the corresponding reference numbers for the sake of practicality.

The use of the clamping devices 1 in each clamp 100, or more generally in the clamp 200, can be easily understood from the description above and does not require further explanation. However, it could be useful to specify that the body CA is clamped gradually and that from the first contact of the notched outer faces 24 of the laminar bodies 20 in each clamping device 1 a rotation occurs of the elongated bodies 30 and 30' around the respective axes A and A', followed by the laminar bodies 20 entering again inside the respective interfaces 22 and 23 by a radial extent proportioned to the compliance characterising the plastic with which the respective interface 22/23 has been produced. The elongated members 30/30' of each clamping device 1 will therefore rotate by different opposite angles every time a clamping device 1 is radially pushed, in use, against the sheath M of the body CA. It is easy to understand that each individual laminar body 20 will be subjected to a radial displacement different than that of the adjacent bodies of the same elongated member or of the adjacent member, due to the local curvature of the body CA. It is easily understood that the combination of the rotation of the interfaces 22/23, mounted on the elongated members 30/30', with the compliance of the same interfaces, due to the material with which they are constructed, allows the laminar bodies 20 to surround in a substantially matching manner the sheath M of each elongated body CA, independently of the diameter of the same sheath M. In this way, the load determined by the body CA is absorbed by each saddle 1 proportionally to the axial compliance thereof, given by the combination of the compliance of the elongated members 30/31 and of the dampening unit 50, arranged and configured to operate in series, as shown in the diagram of FIG. 4. It is easily understood that this solution allows to increase the axial compliance of the clamping devices 1 by using a plurality of damping units arranged radially rather than longitudinally, to minimize the axial extension of the clamping devices 1.

Lastly, it is clearly apparent variants and modifications can be done to each clamp 100, to the clamp 200 comprising a plurality thereof and to each of the respective clamping devices 1, without however departing from the protective scope of the present invention.

Figure 11:
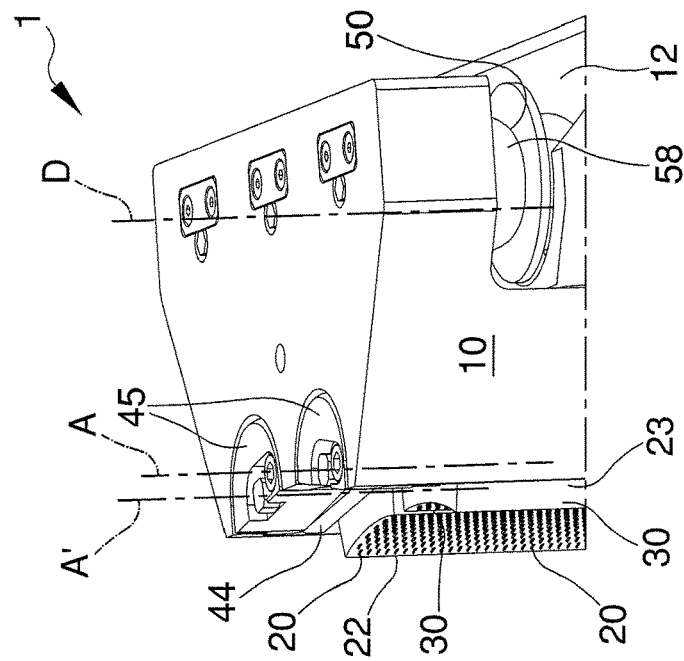
FIG. 11 is a view in enlarged scale of a detail of FIG. 9.
Figure 10:
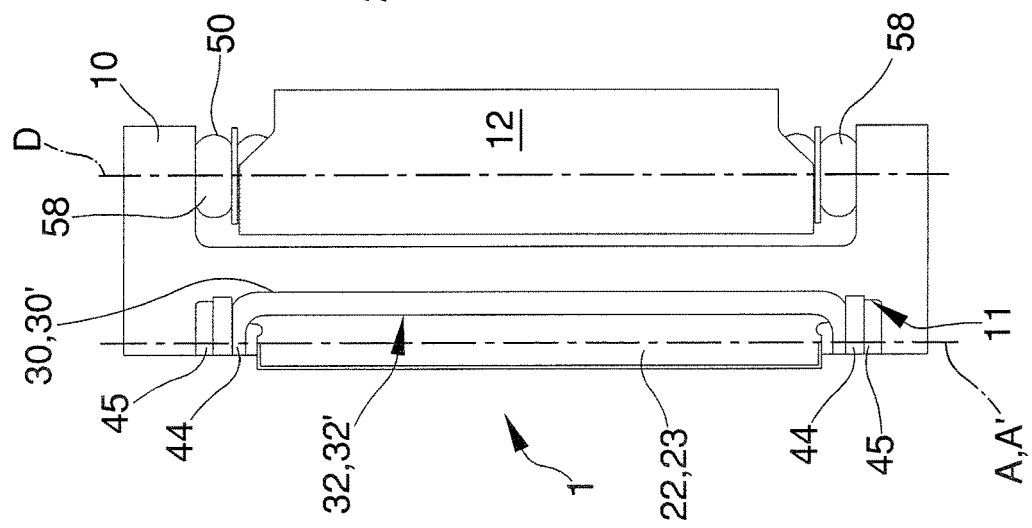
FIG. 10 is a longitudinal cross-section of FIG. 9, in enlarged scale and with some parts removed for the sake of clarity.
Figure 9:
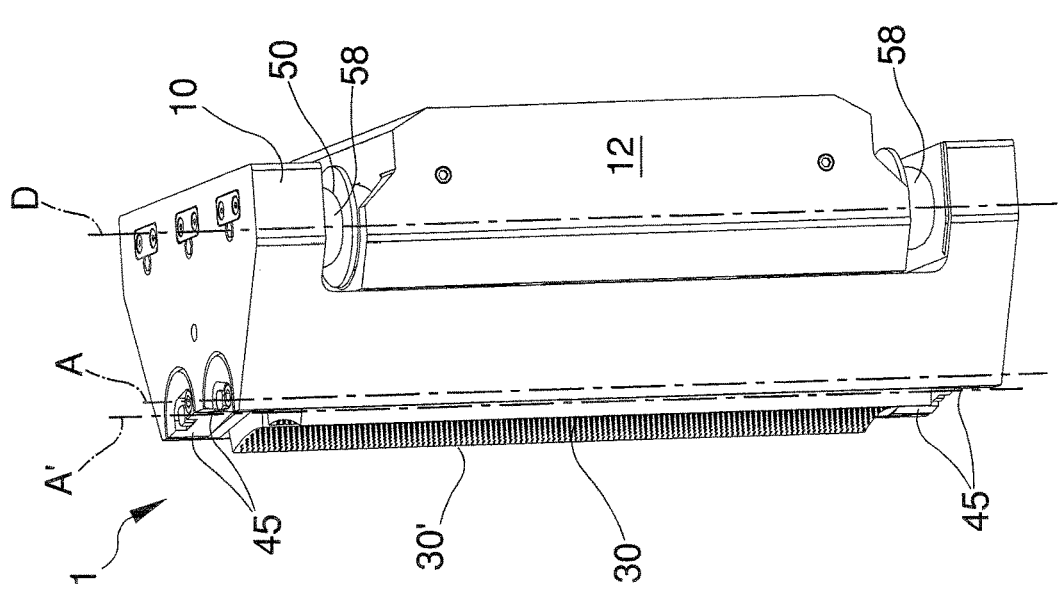
FIG. 9 shows a second preferred embodiment of FIG. 1.

For example, according to the embodiment of the saddle 1 shown in FIGS. 9 to 11, simplified for the sake of drawing economy, the dampening unit 50 may be of normal stress and may comprise a plurality of shock absorbers 58 arranged parallel to said given direction D.

In particular, each shock absorber 58, which is illustrated in FIGS. 9 to 11 through an axial-symmetrical body for the sake of practicality, is configured to operate along the given direction D, so that it can be defined as substantially linear and can be of the fluid-dynamic or mechanical type, without however limiting the protective scope of the present invention. In this regard, it should be specified that the support 10 is C-shaped at the back in order to house the base 12. If deemed useful, at least one of the shock absorbers 58 may be provided with pressure sensors, position sensors or other sensors (where this specification has the sole purpose of providing an example and not limiting the possible choices), thus allowing to control at any time the current position of the support 10 with respect to the base 12.

In a clamp 200 provided with a plurality of layers of clamps 100, and therefore with a plurality of clamping devices 1 arranged in a circle and in layers, the measurement of the axial displacement of each support 10 with respect to the respective base 12 can be useful for verifying the actual distribution of the overall axial load among the various "layers" of clamping devices 100. Of course, it is useful to remember that each elongated body CA has a given tensile stiffness, to which an axial compliance corresponds that can be determined accordingly. Assuming that the body CA has absolute stiffness, and that it is clamped by using a plurality of clamping devices 100 arranged in series on more "layers" and connected together in an axially rigid manner through an appropriately constructed frame, the first clamping device 1 facing the load would be the only one to exert tensile strength up to break, if necessary, due to the lack of distribution of the load on the various layers of clamping devices 1. Moreover, the compliance of each clamping device 1 can be modulated, given the same axial extension of the height of the respective clamp 200, by combining several circumferential dampening stages: in particular both the compensation members 40 and the dampening unit 50. This allows to limit the shear stress to be applied transversally on adjacent segments of the body CA, each interfacing one of the clamping devices 100, and therefore to ensure both the integrity of the body CA and the proper operation of each clamping device 1.

In view of the description above, and in principle, in an ideal clamp 200, the axial compliance of each clamping device 1 should decrease as you move away from the clamping device 1 facing the acting load. To this end, it would be useful to have available a clamping device whose axial compliance is adjustable at will, for example by using fluid dynamic actuators, whose compliance would be adjustable in real time following changes in the instantaneous acting load.

In view of the description above, it is easy to understand that the clamping devices 1 described above and the clamp 200 incorporating them, whether it is a single-layer clamp or a multi-layer clamp, effectively solve the technical problem posed by the applicant in a simple and economical manner.

The invention claimed is:

1. Device (1) designed for axially blocking an axial-symmetrical body (CA) through the application of a radial force; said device (1) comprising:
   a support (10) of given angular extension, provided with a plurality of laminar bodies (20) extending longitudinally in a given direction (D);
   at least one elongated member (30)(30') housed at least partially in a seat (32)(32') of said support (10) that extends along an axis (A)(A') parallel to said given direction (D); each said elongated member (30)(30') being housed in said respective seat (32, 32') rotatably around said axis (A)(A');
   wherein each said elongated member (30)(30') includes a first curved end portion (44) at a first end and a second curved end portion (44) at an opposite second end;
   wherein each said elongated member (30)(30') is rotoidally coupled to said support (10) through a respective head (45), wherein the head (45) is disposed along a top surface of the first curved end portion (44); and
   a centring unit (34) that is configured to allow each said elongated member (30)(30') to couple by friction in an angularly fixed manner to the corresponding said seat (32)(32') under the thrust of a radial force exceeding a minimum threshold value, the centring unit (34) including a first pin (35) that passes through the head (45) and is coupled to said elongated member (30)(30') to rotoidally couple said elongated member (30)(30') to said head (45), the centring unit (34) further including an elastic toroidal interface (36) that surrounds the first pin (35) and engages a hole (450) formed in the first curved end portion (44);
   wherein the head (45) is disposed within the respective seat (32, 32') and includes a toroidal projection (45') that is configured to allow said head (45) to resist against axial forces acting on the respective elongated member (30)(30').

2. Device according to claim 1, characterized in that each said seat (32)(32') is cylindrical, each said elongated member (30)(30') having a respective cylindrical face facing the respective said seat (32)(32').

3. Device according to claim 1, characterized in that each said elongated member (30)(30') is longitudinally delimited by two substantially L-shaped end portions (44), each of which is engaged by said pin (35).

4. Device according to claim 1, characterized in that each said laminar bodies (20) is incorporated in an interface (22)(23) made of deformable material so as to copy radially the outer shape of said axial-symmetrical body (CA).

5. Device according to claim 1, characterized in that each said laminar body (20) is provided with a toothed transverse outer face (24).

6. Device according to claim 1, characterized by comprising at least two damping stages (30, 30')(50) arranged mechanically in series.

7. Device according to claim 1, characterized in that said support (10) is carried by a base (12) through the interposition of first damping means (50).

8. Device according to claim 7, characterized in that said first damping means (50) comprise a sandwich-like body (52) to resist in a yielding way to the loads directed along said given direction (D) tangentially.

9. Device according to claim 8, characterized in that said sandwich-like body (52) is provided with at least a first sheet (54) that is made of plastic and is adhesively coupled to at least a second sheet (56)(56') made of metal.

10. Device according to claim 7, characterized by comprising second damping means (50) comprising a plurality of damping members (58) arranged in parallel between said support (10) and said base (12) so as to act, in use, along said given direction (D).

11. Device according to claim 1, characterized by comprising two elongated members (30)(30') for each said support (10).

12. Clamp (100)(200) comprising a plurality circumferentially arranged holding devices according to claim 1.

13. Clamp (200) according to claim 12, characterized by comprising a plurality of said holding devices (1) arranged axially in layers.

14. Device according to claim 1, wherein the centring unit (34) for each said elongated member (30)(30') further includes a second pin (35), wherein one of the first pin (35) and the second pin (35) being coupled to the first curved end portion (44) and the other of the first pin (35) and the second pin (35) being coupled to the second curved end portion (44).

15. Device according to claim 1, wherein one laminar body (20) is disposed between the first curved end portion (44) and the second curved end portion (44).

16. Device according to claim 1, further including a dampening unit (50) is disposed longitudinally along a rear of the support (10).

17. Device (1) designed for axially blocking an axial-symmetrical body (CA) through the application of a radial force; said device (1) comprising:

a support (10) of given angular extension, provided with a plurality of laminar bodies (20) extending longitudinally in a given direction (D);

at least one elongated member (30)(30') housed at least partially in a seat (32)(32') of said support (10) that extends along an axis (A)(A') parallel to said given direction (D); each said elongated member (30)(30') being housed in said respective seat (32, 32') rotatably around said axis (A)(A');

wherein each said elongated member (30)(30') is rotoidally coupled to said support (10) through a pair of heads (45), wherein one head (45) is disposed above one respective laminar body (20) and the other head (45) is disposed below the one respective laminar body (20); and a centring unit (34) that is configured to allow each said elongated member (30)(30') to couple by friction in an angularly fixed manner to the corresponding said seat (32)(32') under the thrust of a radial force exceeding a minimum threshold value, the centring unit (34) including a first pin (35) that passes through the one head (45) and is coupled to said elongated member (30)(30') and a second pin (35) that passes through the other head (45) and is coupled to said elongated member (30)(30') to rotoidally couple said elongated member (30)(30') to said other head (45), the centring unit (34) further including first and second elastic toroidal interfaces (36) that surround the first pin (35) and the second pin (35) respectively.

* * * * *